(12) United States Patent
Baptista da Costa et al.

(10) Patent No.: US 7,563,299 B2
(45) Date of Patent: Jul. 21, 2009

(54) FILTERING APPARATUS, FILTER REGULATOR FOR USE WITH SPRAY GUN AND SPRAYING SYSTEM USING THE SAME

(75) Inventors: Roberto Baptista da Costa, Sao Paulo (BR); Nelson Testa Filho, Sao Bernardo do Campo (BR); Kleber Batista, Sao Paulo (BR)

(73) Assignee: Illinois Tool Works Inc., Glenview, IL (US)

( * ) Notice: Subject to any disclaimer, the term of this patent is extended or adjusted under 35 U.S.C. 154(b) by 298 days.

(21) Appl. No.: 11/557,421

(22) Filed: Nov. 7, 2006

(65) Prior Publication Data

US 2007/0137156 A1    Jun. 21, 2007

Related U.S. Application Data

(60) Provisional application No. 60/734,574, filed on Nov. 8, 2005.

(51) Int. Cl.
*B01D 46/24* (2006.01)
*B01D 50/00* (2006.01)

(52) U.S. Cl. .............................. 55/488; 55/323; 55/337; 55/482; 55/498; 55/DIG. 17; 96/421

(58) Field of Classification Search ................... 55/318, 55/320, 321, 323, 332, 337, 482, 486, 487, 55/488, 489, DIG. 17; 96/417, 421
See application file for complete search history.

(56) References Cited

U.S. PATENT DOCUMENTS

| | | | |
|---|---|---|---|
| 2,706,995 A | 4/1955 | May | |
| 3,357,162 A | 12/1967 | Doig | |
| 4,020,525 A | 5/1977 | Fromknecht | |
| 4,203,739 A | 5/1980 | Erdmannsdorfer | |
| 5,190,569 A | 3/1993 | McGrath | |
| 6,309,436 B1 | 10/2001 | Holch | |
| 7,326,266 B2 | 2/2008 | Barnwell | |
| 2003/0230636 A1 | 12/2003 | Rogers | |

FOREIGN PATENT DOCUMENTS

| | | |
|---|---|---|
| DE | 9318983 U1 | 3/1994 |
| DE | 4442128 A1 | 5/1996 |
| EP | 0878227 A2 | 11/1998 |
| JP | 55023368 A | 2/1980 |
| WO | 98/31452 A | 7/1998 |

OTHER PUBLICATIONS

Search Report issued in corresponding foreign application on Feb. 22, 2007.
ISR for PCT/US06/43447 dated Feb. 27, 2008.

*Primary Examiner*—Duane Smith
*Assistant Examiner*—Robert A Clemente
(74) *Attorney, Agent, or Firm*—Lowe Hauptman Ham & Berner LLP

(57) ABSTRACT

A filtering apparatus includes a housing having an inlet and at least an outlet, and a filter arrangement disposed in the housing, downstream of the inlet and upstream of the outlet for filtering a pressurized gas entering the housing through the inlet to provide a filtered pressurized gas at the outlet. The filter arrangement has first and second tubular filter elements. The first filter element is received within the second filter element. The filtering apparatus can be configured as a filter regulator when equipped with a pressure regulator. The filtering apparatus of filter regulator can be used with one or more spray guns or in a spraying system.

20 Claims, 13 Drawing Sheets

SECTION IV - IV

FILTERING APPARATUS, FILTER REGULATOR FOR USE WITH SPRAY GUN AND SPRAYING SYSTEM USING THE SAME

CROSS REFERENCE

This application is based on and claims the benefit of US Provisional Application No. 60/734,574 filed Nov. 8, 2005 which is incorporated herein by reference in its entirety.

TECHNICAL FIELD

The disclosed embodiments relate to a filtering apparatus, a filter regulator for use with one or more spray guns, and a spraying system using the same.

BACKGROUND

Clean, compressed air has been known to be critical for operation of equipment that runs on compressed air, such as various air operated instruments, paint spray equipment, and other pneumatic devices that require oil and liquid free compressed natural gas or air.

There is a need for devices that can provide such clean compressed air or compressed gas at the line pressure and/or a desired regulated pressure.

SUMMARY

In an aspect, a filtering apparatus includes a housing having an inlet and at least an outlet, and a filter arrangement disposed in the housing, downstream of the inlet and upstream of the outlet for filtering a pressurized gas entering the housing through the inlet to provide a filtered pressurized gas at the outlet. The filter arrangement has first and second tubular filter elements. The first filter element is received within the second filter element.

In another aspect, the filtering apparatus is configured as a filter regulator when equipped with a pressure regulator.

In a further aspect, a spraying system using the filtering apparatus or the filter regulator is provided.

Additional aspects and advantages of the disclosed embodiments are set forth in part in the description which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The disclosed embodiments are illustrated by way of example, and not by limitation, in the figures of the accompanying drawings, wherein elements having the same reference numeral designations represent like elements throughout.

DETAILED DESCRIPTION OF EMBODIMENTS

Figures 1A, 1B:
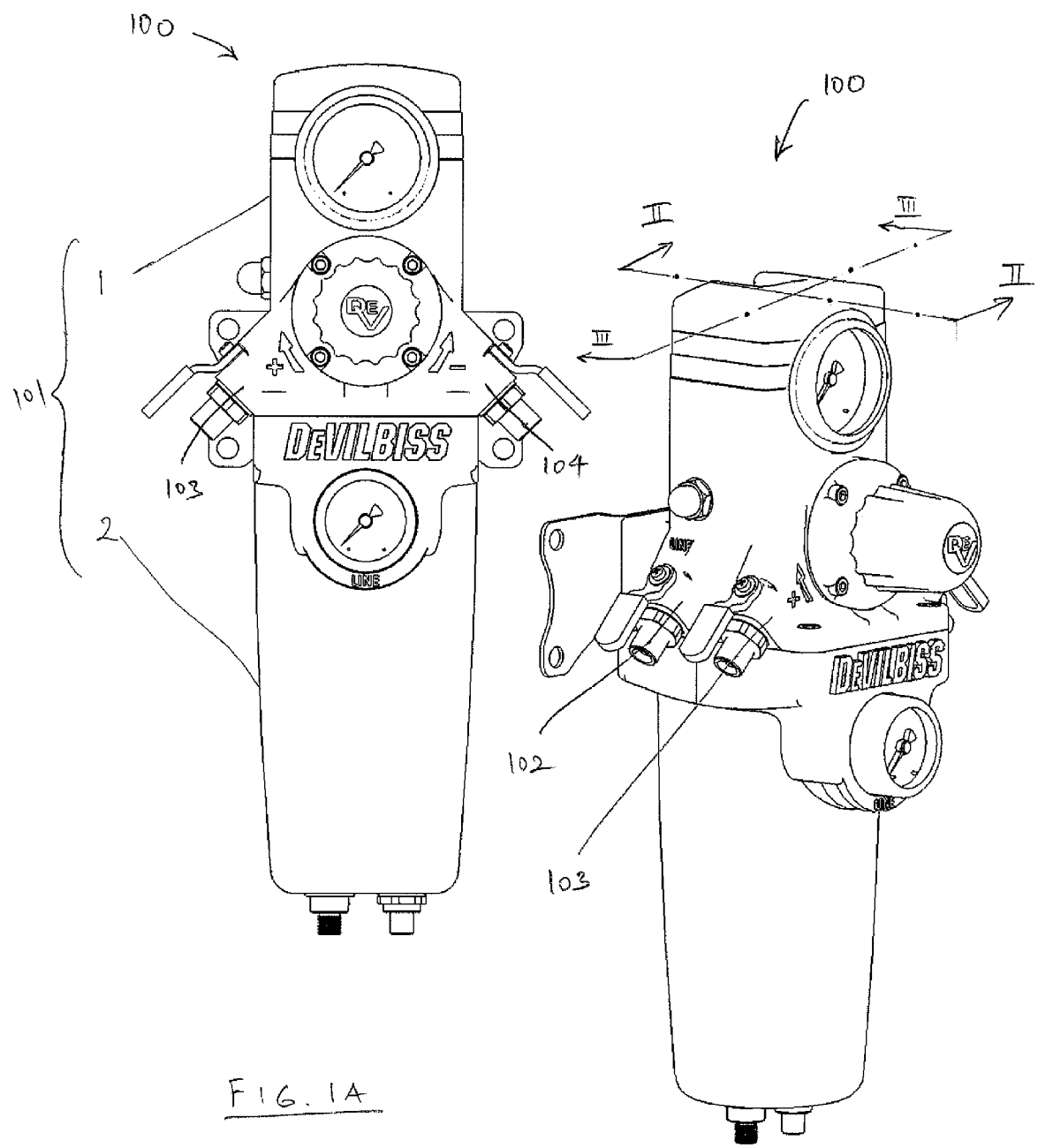
FIG. 1A is a front view of a filter regulator in accordance with an embodiment of the present invention.
FIG. 1B is a front-left-top perspective view of the filter regulator shown in FIG. 1A.

In the following detailed description, for purposes of explanation, numerous specific details are set forth in order to provide a thorough understanding of the embodiments. It will be apparent, however, that the embodiments may be practiced without these specific details. In other instances, well-known structures and devices are schematically shown in order to simplify the drawing.

FIGS. 1A and 1B are front and perspective views of a filter regulator 100 in accordance with an embodiment of the present invention. Cross-sectional views of filter regulator 100 are provided in FIGS. 2-4. FIG. 6 is an exploded view of filter regulator 100. FIGS. 8-12 are various views of a filter regulator 800 which is a simplified version of filter regulator 100 shown in FIGS. 1-7. In particular, filter regulator 800 neither includes a line pressure gauge (such as 26), nor a filter-change indicator (such as 29). Additionally, valves 22, 23 of filter regulator 100 are replaced with manual drain cocks 30, 31 in filter regulator 800. Filter regulator 800 is otherwise substantially identical to filter regulator 100 and filter regulators 100 and 800 will be described in further detail herein together.

As can be seen in FIG. 1A, filter regulator 100 includes a housing 101 which in turn includes an upper portion or hollow body 1, and a lower portion or bowl 2. Body 1 and bowl 2 in an embodiment are separately manufactured and fastened together, e.g., by bolts 651 shown in FIG. 6. Body 1 and bowl 2 can also be attached by threaded or bayonet connections. A sealing element, such as O ring 676 in FIG. 6, is used in an embodiment to ensure that the connection between body 1 and bowl 2 is airtight. The above-described detachable arrangement allows for removal of bowl 2 from body 1 for maintenance or service. Each or both bowl 2 and hollow body 1 can be made of metal or any suitable material, such as plastic. Other arrangements and/or materials are, however, not excluded.

Housing 101 includes an inlet 252 (FIGS. 2 and 9B) which, in an embodiment, is located at the upper portion or body 1 of housing 101. Inlet 252 is configured for connection to a source (not shown) of pressurized gas, such as compressed air. The connection between inlet 252 and the source of pressurized gas can be of any type known in the art and will not be described in further detail herein. In the specific embodiment shown in FIGS. 2 and 9B, inlet 252 is a hole arranged on a rear side of filter regulator 100 and oriented upwardly. This arrangement facilitates connection, e.g., via a hose, of the source of pressurized gas to inlet 252, without causing significant obstruction of the work area in the front of filter regulator 100. Other arrangements are, however, not excluded.

Housing 101 further includes at least an outlet at which the pressurized gas that enters filter regulator 100 via inlet 252 and filtered by a filter arrangement as will be described hereinafter is provided as a filtered pressurized gas. In the specific embodiment disclosed in FIGS. 1-6, there are four outlets 102-104 (FIGS. 1A-1B) and 105 (FIG. 6) provided at the upper portion or body 1 of housing 101. Outlets 102-105 are located at opposite lateral sides of filter regulator 100 and oriented obliquely downwardly as best seen in FIG. 9C. This arrangement avoids kinking of the hoses (not shown) to be connected to outlets 102-105. Other arrangements are, however, not excluded. In addition, the number of the outlets of filter regulator 100 is not limited to four and may vary depending on the applications.

Among outlets 102-105 of filter regulator 100, outlets 103-105 are regulated outlets at which the filtered pressurized gas is provided at a desired pressure regulated by a pressure regulator as will be described hereinafter. In contrast, outlet 102 is a unregulated outlet at which the filtered pressurized gas is provided at or near the line pressure of the unfiltered pressurized gas that enters filter regulator 100 via inlet 252. In other words, the pressure of the filtered pressurized gas at unregulated outlet 102 is not regulated by the pressure regulator. The regulated filtered pressurized gas at outlets 103-105 can be used for applications that require clean or filtered pressurized gas at a specific pressure, for example, paint spraying or paint pressurizing. For applications that do not require the filtered pressurized gas to be at a specific pressure, such as duster guns, unregulated outlet 102 can be employed. Again, the numbers of regulated and unregulated outlets of filter regulator 100 are not limited to the specifically disclosed numbers, and may vary depending on applications. For example, all outlets can be regulated outlets or unregulated outlets. In the latter case, i.e., all outlets are unregulated outlets, the pressure regulator can be omitted and filter regulator 100 becomes a filtering apparatus that simply provides filtered pressurized gas without any pressure regulation. Other arrangements are, however, not excluded.

As can be seen in FIG. 6, each outlet 102-105 is equipped with a valve 653 for selectively opening and closing the outlet. In an embodiment, valves 653 are ball valves as best seen in FIG. 9C, but valves of other types can be used. Each outlet 102-105 includes multiple holes 654, 655 for respectively fitting the main body and handle of valve 653 as shown in FIG. 6. Other arrangements are, however, not excluded. In addition, one or more valves 653 can be omitted or provided separately from filter regulator 100 in which case the respective outlets 102-105 will be connected to the separately provided valve or valves by fittings or the like.

Return now to FIG. 2 where the internal structure of filter regulator 100 is depicted. In particular, filter regulator 100 includes, besides housing 101, a filter arrangement 256 which is located downstream of inlet 252 and upstream of outlets 102-105 for filtering the pressurized gas that enters filter regulator 100 via inlet 252 and providing the filtered pressurized gas, either pressure-regulated or unregulated, at outlets 102-105.

Filter arrangement 256 is located in the lower portion or bowl 2 of housing 101 and includes at least two filter elements 4 and 5 one arranged within another. In the specific embodiment of FIG. 2, outer filter element 4 is located upstream of inner filter element 5, meaning that the pressurized gas, in operation, moves in the outside-to-inside direction through filter element 4 then through filter element 5, and escapes to the upper portion or body 1 of housing 101 through the internal space within filter element 5 as shown by arrows in FIG. 9B. The upstream filter, i.e., filter element 4, is configured as a coarse filter, whereas the downstream filter, i.e., filter element 5, is configured as a fine filter. Coarse filter 4 is positioned upstream of fine filter 5 to remove contaminants of large size that would otherwise easily clog the fine filter 5. The reversed arrangement wherein outer filter element 4 is located downstream of inner filter element 5, meaning that the pressurized gas, in operation, moves in the reversed, inside-to-outside direction is not excluded but would require certain rearrangement of parts.

In a specific embodiment, the coarse filter or filter element 4 is a particulate or porous filter, whereas the fine filter or filter element 5 is a coalescing filter or a coalescer.

Particulate filter 4 is configured for removing particles, such as dirt, rust and pipe scale, of a certain size from the pressurized gas and preventing such particles from clogging the downstream filter element, i.e., coalescing filter 5. Thus, particulate filter 4 functions as a pre-filter that insures long service life and high efficiency of coalescing filter 5 in particular and filter arrangement 256 as well as filter regulator 100 in general. Particulate filter 4 can be configured in any manner known in the art. For example, particulate filter 4 may include a mesh or porous material of a certain mesh size. In an embodiment, particulate filter 4 comprises a plurality of plastic balls or spheres compressed together until a predetermined porousness is obtained. In an embodiment, particulate filter 4 is configured to trap or intercept particles as small as 1 μm in diameter. Other arrangements and/or mesh sizes are not excluded.

Coalescing filter 5 is configured for removing oil and/or water and/or other liquid substance and/or their vapor from the pre-filtered pressurized gas that has passed particulate filter 4. Coalescing filter 5 is also responsible for trapping very fine particles that escape particulate filter 4. Coalescing filter 5 can be configured in any manner known in the art. For example, coalescing filter 5 may include a fibrous assembly comprising a plurality of fine fibers which, in an embodiment, can be micro-fibers having a sub-micron diameter or a diameter of a few to several tens of microns (μm) depending on applications. Such fibers or micro-fibers can be glass fibers or glass micro-fibers arranged in a single layer or several layers. Other arrangements and/or material and/or fiber sizes are, however, not excluded.

Coalescing filter 5 generally removes solid contaminants in a direct impact and/or interception mode, and liquid or vapor contaminants in a diffusion mode. In particular, solid contaminants (i.e., fine particles that escape particulate filter 4) of a specified size and/or mass collide with the fibers or other filter media used in coalescing filter 5 and adhere thereto. Liquid or vapor contaminants, e.g., aerosols, which also strike the fibers or filter media when a stream of the pre-filtered pressurized gas passes through coalescing filter 5, do not permanently adhere to the fibers or filter media. Rather, the aerosols are united together as they move under gravity down along the fibers to form larger drops. The drops grow until their masses are sufficient to cause the drops to fall out of the fibers or filter medium or media of coalescing filter 5 to be subsequently drained away.

Figure 2:
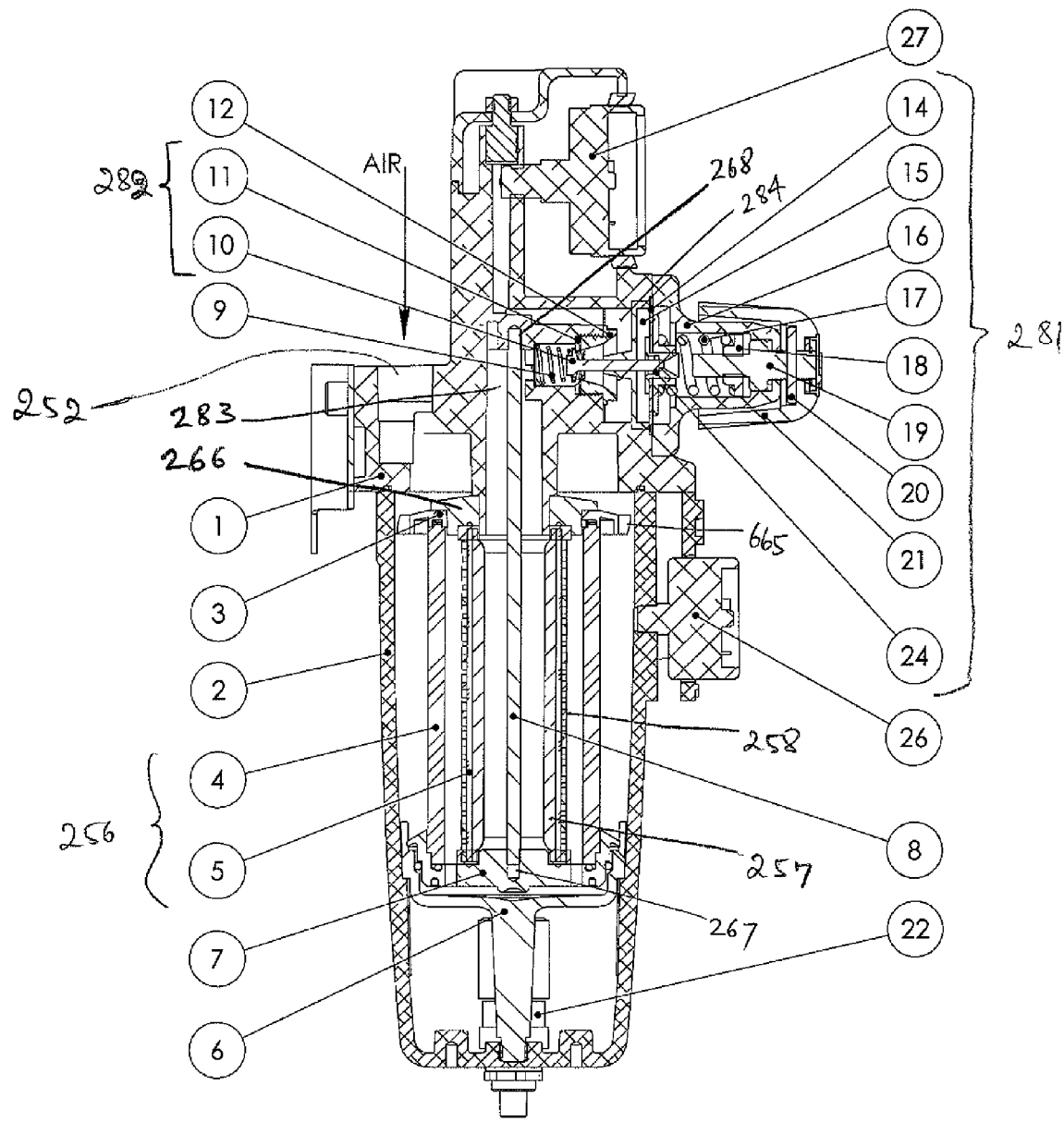
FIG. 2 is a cross sectional view taken along line II-II in FIG. 1B.

As can be seen in FIG. 2, coalescing filter 5 includes an inner support layer or core 257 and an outer filter medium 258. Alternative arrangements, wherein filter medium 258 is on the outer side and support layer 257 is on the inner side, or wherein multiple filter media 258 are provided on both inner and outer sides of support layer 257, or wherein multiple support layers 257 are provided on both inner and outer sides of one or more filter media 258, are not excluded.

Support layer 257 is configured to provide mechanical strength to coalescing filter 5 as a whole. Support layer 257, in an embodiment, is configured as a perforated sleeve. A suitable material for support layer 257 includes metals, such as stainless steel. Other arrangements and/or materials are, however, not excluded.

Outer filter medium or media 258 can include one or more fibrous layers as described above. The fibrous layers can be smooth or pleated. Filter medium or media 258 may also include or coated with a drainage layer, which can be hydrophobic, for facilitating drainage of coalesced liquid, e.g., oil or water. Filter medium 258 in an embodiment is configured to remove liquid droplets and particles as small as 0.1 micron in diameter with an efficiency as high as 95% or greater. Again, other arrangements and/or materials and/or filter size and efficiency are not excluded.

As can be seen in FIG. 6, filter element 4 and filter element 5 are separable from one another and can be individually serviced and/or replaced. It is, however, not excluded that the filter elements can be made integral in a single filter cartridge for facilitating assembly of the filter regulator 100, and/or ensuring the desired quality or cleanness of the filtered pressurized gas when the entire filter arrangement 256 is replaced. It should be noted that filter arrangement 256, in other embodiments, may include more than two filter elements. The filter elements are not necessarily cylindrical in shape as specifically disclosed in FIGS. 2-6. Rather, one or some or all of the filter elements can have a conical or truncated conical shape. The filter elements are not required to be circular in cross section and can have other cross sectional shapes, such as square, hexagon, etc.

Filter arrangement 256 is supported from below, in accordance with the embodiment shown in FIG. 2, by a bottom plate 7 which has a single or several grooves best seen in FIG. 6 for receiving therein lower ends of filter elements 4, 5. The groove or grooves temporarily fix filter elements 4, 5 in place for assembly of filter regulator 100. Bottom plate 7 further includes at least one through hole 359 for draining away the liquid coalesced by coalescing filter 5. There are four through holes 359 depicted in FIGS. 3-4, however, any other number of such through holes can be provided in bottom plate 7. The through holes 359 in the embodiment of FIG. 2 are located corresponding to the space between filter elements 4 and 5. Other arrangements are, however, not excluded. For example, through holes 359 can be provided below and/or radially inside coalescing filter 5. Bottom plate 7 can be made of any suitable material such as plastic and/or metal. In an embodiment, bottom plate 7 includes a plastic disc that defines the groove or grooves for positioning filter elements 4, 5, and a metal, e.g., brass, member at the center of such disc for reliable connection to a rod 8 as will be described in detail herein below. Other configurations and/or materials are not excluded.

A cup 6 is disposed below bottom plate 7 for collecting therein the coalesced liquid that has passed through holes 359. As best seen in FIG. 6, cup 6 includes an upper enlarged portion 660 and a lower narrow portion 661. Upper enlarged portion 660 of cup 6 is configured to sealingly receive therein bottom plate 7. An O-ring 662 can be used for sealing between cup 6 and bottom plate 7. Lower narrow portion 661 of cup 6 in an embodiment has a funnel shape. Other shapes are, however, not excluded.

Figures 3, 4:
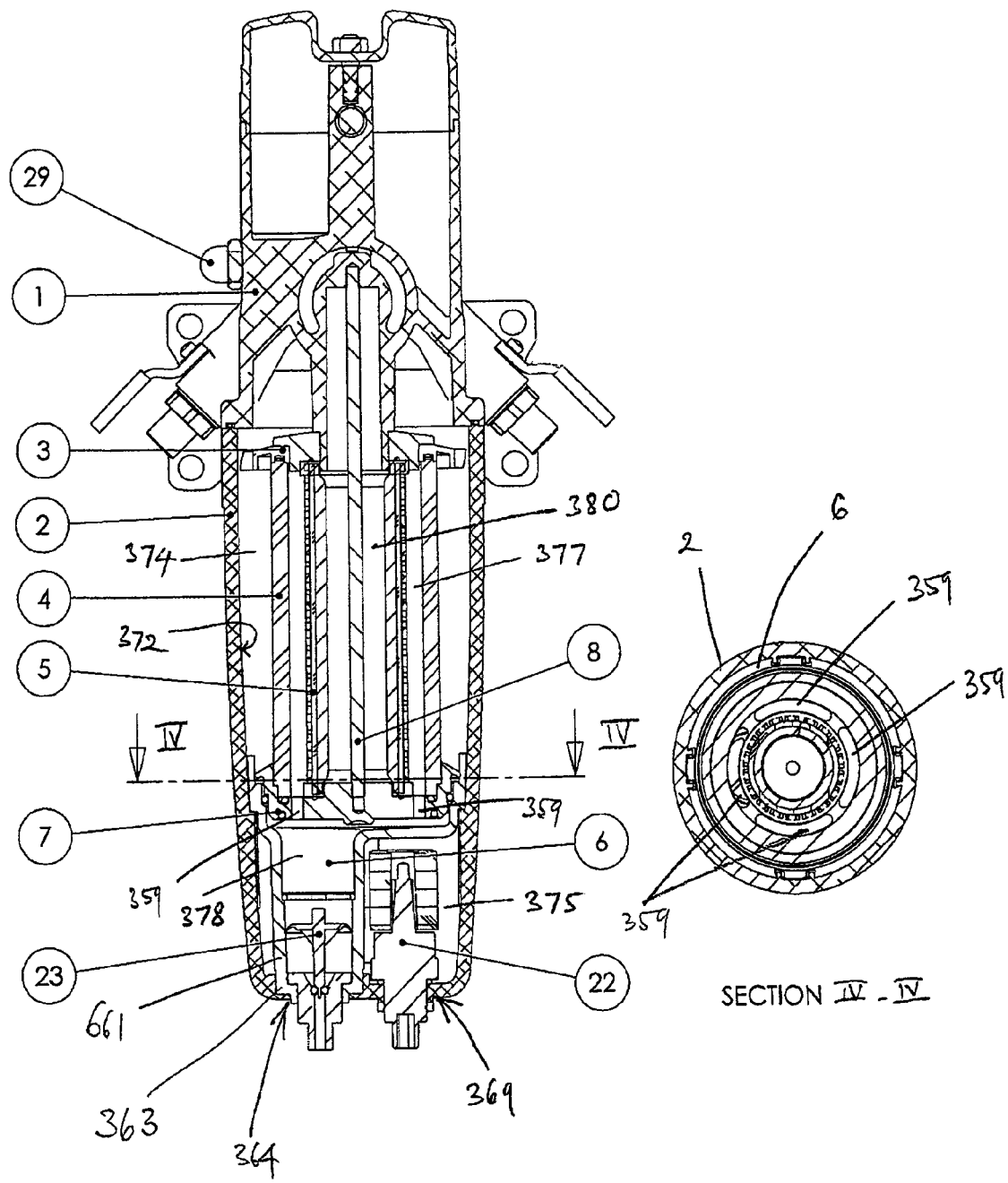
FIG. 3 is a cross sectional view taken along line III-III in FIG. 1B.
FIG. 4 is a cross sectional view taken along line IV-IV in FIG. 3.

Lower narrow portion 661 has an opening 363 (FIG. 3) at a bottom of cup 6 for draining away the coalesced liquid collected in cup 6. Lower narrow portion 661 is sealingly fit in a hole 364 at a bottom of bowl 2. In the embodiment of FIG. 3, no separate O-ring is required for sealing between lower narrow portion 661 and hole 364. For example, the outer wall of lower narrow portion 661 and/or the inner wall of hole 364 may include resilient ribs for frictionally holding lower narrow portion 661 in hole 364 and sealing between the elements. Cup 6 can be made of any suitable material, such as metal or plastic. When cup 6 is made of plastic, the resilient ribs at the outer wall of lower narrow portion 661 can be molded together with the remainder of cup 6, and cup 6 so manufactured can be press-fit into hole 364 at the bottom of bowl 2. Other arrangements, such as when an O-ring is used for sealing between cup 6 and bowl 2, are not excluded.

Cup 6 and the inner wall of bowl 2 in an embodiment include matching flanges which engage, as best seen in FIGS. 2-3, when cup 6 has been sufficiently pressed into hole 364 at the bottom of bowl 2, thereby stopping cup 6 from being further pressed into hole 364. As described above, hole 364 of bowl 2 and lower narrow portion 661 of cup 6 are in sealing contact or have a sealing element therebetween. However, the inner side wall, e.g., 372 (FIG. 3), of bowl 2 and the outer side wall, e.g., 673 (FIG. 6) of cup 6 are not entirely in sealing contact. Cup 6 in some embodiments even includes one or more cutout portions in outer side wall 673. As a result, there is a fluid communication between a space 374 (FIG. 3), which is located above cup 6 and between inner side wall 372 of bowl 2 and filter element 4, and a space 375 (FIG. 3), which is located below cup 6. Such fluid communication allows water or liquid drops and, sometimes, solid particles to flow along inner side wall 372 of bowl 2, pass cup 6 and collect in space 375 for being drained away, as will be described herein after.

Inside opening 363 at the bottom of cup 6, a valve 23 is provided for selectively opening and closing opening 363. Valve 23 can be an automatic valve or a drain cock. In the embodiment of FIG. 2, valve 23 is an automatic valve of a float type which will be automatically opened when the coalesced liquid in lower narrow portion 661 has reached a predetermined level. A manual valve or drain cock can be used instead, as shown at 30 in FIGS. 8B and 9. Valves of other types, such as electronic automatic valves, are not excluded.

At the upper end of filter arrangement 256, a deflector 3 is positioned as best seen in FIGS. 2-3. Deflector 3 has fins around its edge as best seen at 665 in FIG. 6. Fins 665 are slanted relative to the axial direction of filter arrangement 256 and/or axial direction of inlet 252 for imparting a swirling motion to the flow of pressurized gas entering housing 101 through inlet 252 as will be detailed herein after. Deflector 3 can be generally annular in shape as disclosed in FIG. 6, or may include a cylindrical skirt as disclosed in the related U.S. Provisional Application No. 60/734,574. Generally, deflector 3 is stationary and does not rotate despite the flow of pressurized gas in filter regulator 100.

Deflector 3, in an embodiment, is self-positioned on top of one and or both of filter elements 4, 5 by a groove on its underside that matched with the top end of the filter elements 4 and/or 5. In a further embodiment, a cap 266 (FIG. 2) is used to center deflector 3 on top of filter arrangement 256. In particular, cap 266 is fit in a central hole of deflector 3 on the one hand, and fits over the top end of filter element 5 on the other hand, as shown in FIG. 2. Cap 266 and/or deflector 3 function as bottom plate 7 to temporarily fix filter arrangement 256 in place before assembly of filter regulator 100. Cap 266 and/or deflector 3 and bottom plate 7 also function to maintain a desired spacing between filter elements 4, 5 of filter arrangement 256.

Besides hole 364, bowl 2 further includes another hole 369 (FIG. 3) at its bottom for draining water or other liquids collected therein due to the swirling motion imparted by deflector 3 to the stream of pressurized gas, as will be described in detail herein below. Like hole 364 and opening 363, hole 369 is also equipped with a valve 22 (FIG. 3) or 30 (FIG. 10) for selectively draining the collected liquid or water.

A fastening rod 8 is provided to fasten bottom plate 7 with the upper portion or hollow body 1 of housing 101, thereby clamping filter arrangement 256 together with deflector 3 and cap 266, if provided, therebetween. Specifically, rod 8 in the embodiment of FIG. 2 includes two threaded ends that can be threadedly, removably screwed into respective threaded holes 267, 268 in bottom plate 7 and hollow body 1. Other connection types, such as bayonet connections, can be used at either or both ends of rod 8. It is not excluded that rod 8 can be made integral with either of bottom plate 7 and hollow body 1. In an embodiment wherein rod 8 is screwed or otherwise detachably connected with hole 267 of bottom plate 7, such hole 267 is provided in a metal, e.g., brass, member at the center of bottom plate 7 for ensuring desirable mechanical strength of the connection. In this case, bottom plate 7 can be formed by molding a plastic disc portion around the brass member.

In an embodiment, O-rings, such as 670, 671 in FIG. 6, are used to seal between filter element 4 and deflector 3 at the upper end of filter element 4 and bottom plate 7. Although FIG. 6 does not disclose any O-rings or other sealing elements between filter element 5 and deflector 3 and bottom plate 7, such O-rings or sealing elements can be provided in accordance with other embodiments.

In addition, although FIG. 6 discloses cap 665 and deflector 3 as being separate from hollow body 1, the elements in some embodiments can be made integral with hollow body 1 for reducing the number of parts. In an alternative embodiment, only cap 665 is made integral with hollow body 1, whereas deflector 3 is made as a separate element. Other arrangements are, however, not excluded.

The operation of the filtering section of filter regulator 100 as described above will now be explained with reference to FIGS. 9B-9D.

Figure 9A:
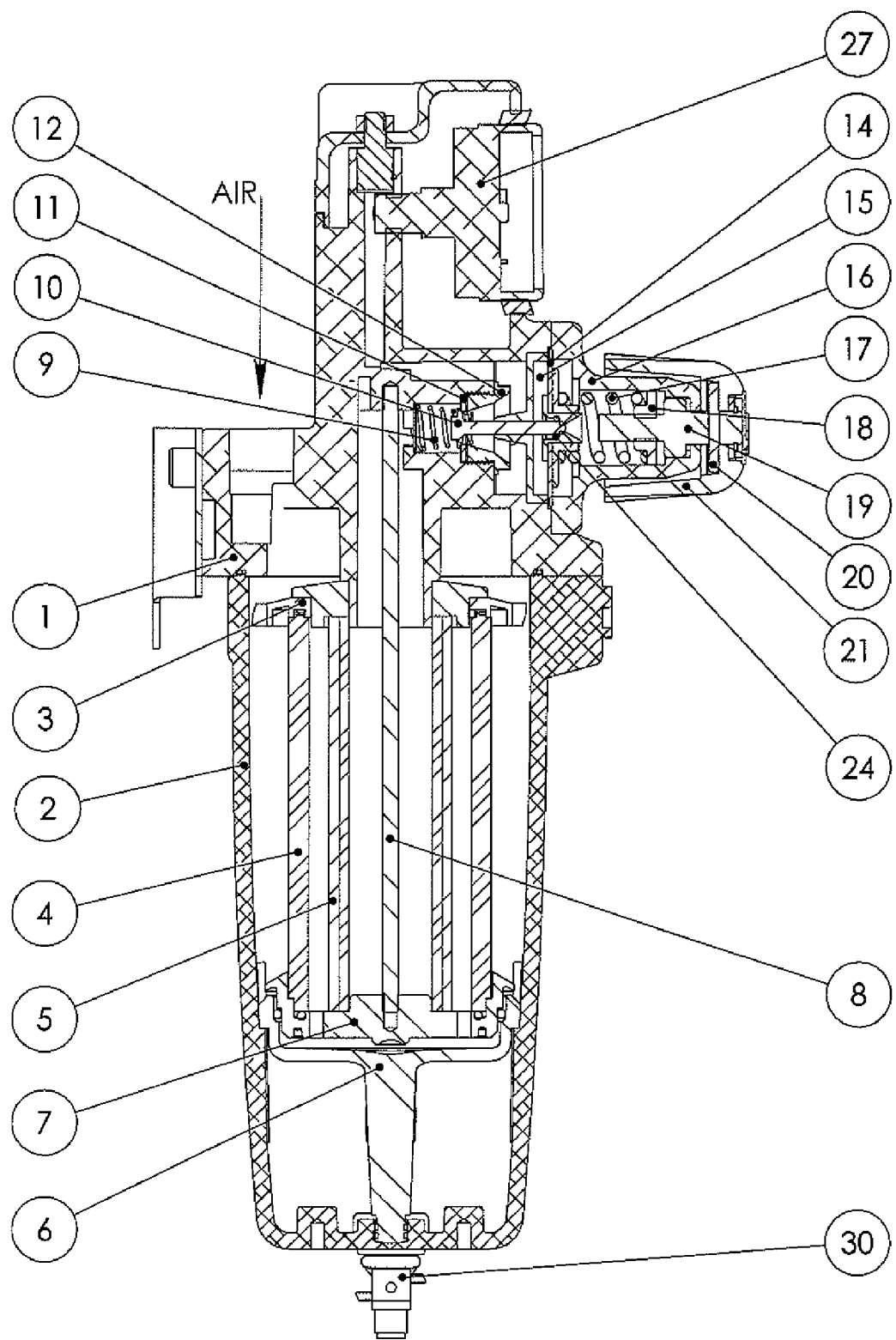
FIG. 9A is a cross sectional view taken along line IX-IX in FIG. 8B showing one half of the filter regulator.
Figure 9B:
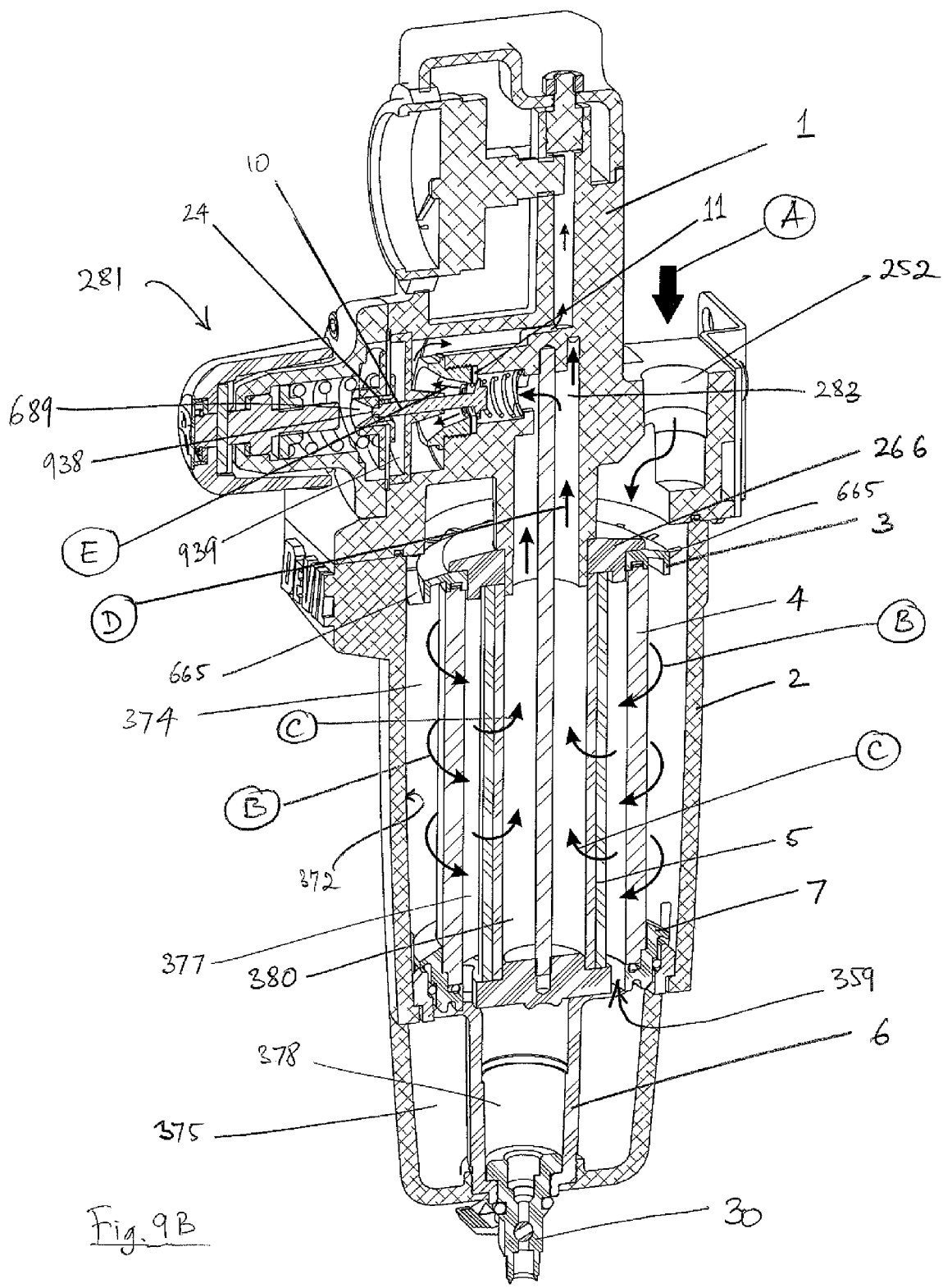
FIG. 9B is a perspective view of the other half of the filter regulator.
Figure 9C:
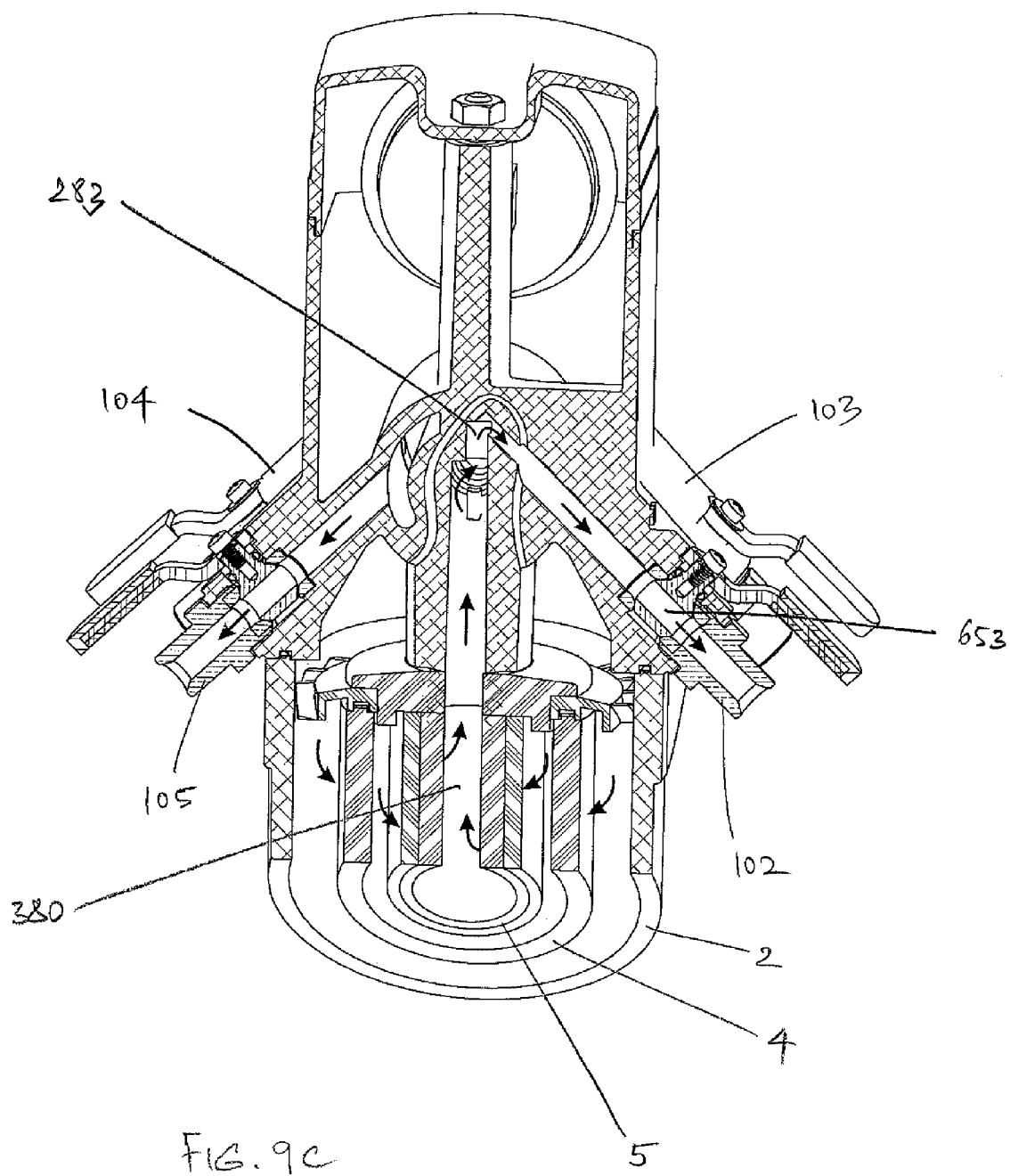
FIG. 9C is a cutaway perspective view showing an internal structure of the filter regulator from the rear of the filter regulator.

A flow of pressurized gas, such as compressed air, enters filter regulator 100 or 800 through inlet 252 as indicated by arrow A in FIG. 9B. The pressurized gas flow is guided into a swirling pattern by deflector 3 as indicated by arrows B in FIG. 9B. Water, oil or other liquids as well as some solid contaminants, such as debris, contained in the pressurized gas are separated from the pressurized gas flow as a result of centrifugal force caused by the swirling motion and are forced to inner side wall 372 of bowl 2 by such centrifugal force. The separated solid contaminants, water, oil or other liquids slide down inner side wall 372 of bowl 2, pass cup 6 and collect in space 375 below cup 6. Thus, cup 6 functions as a baffle that creates a quiet zone, i.e., space 375, at the bottom of bowl 2, and prevents the swirling pressurized gas flow from reaching the solid contaminants, water, oil or other liquids that have been collected at the bottom of bowl 2. In this manner, the accumulated contamination (solid and/or liquid) is ultimately kept out of the swirling pressurized gas flow, and remains at the bottom of bowl 2 without being entrained or re-entrained back into the swirling pressurized gas flow, until such accumulated contamination can be removed from bowl 2 via drain cock 30 or automatic drain 22.

The swirling pressurized gas flow in space 374 continues to pass through filter element 4 which removes most solid particles. The swirling pressurized gas flow having passed filter element 4 then enters a space 377 between filter elements 4 and 5 as a flow of pre-filtered pressurized gas.

Then, the pre-filtered pressurized gas flow continues to pass through filter element 5 (arrows C in FIG. 9B) which will trap the fine solid particles that have passed filter element 4 as well as liquid particles, e.g., droplets of water, oil or other liquids, and/or their vapor. The captured droplets combine or coalesce and are subsequently pulled by gravity down to the lower end of filter element 5 where the coalesced water oil or liquids flow through through holes 359 of bottom plate 7 into the bottom section of cup 6.

Bottom plate 7 functions as a baffle that creates a second quiet zone 378 at the bottom of cup 6, and prevents the pre-filtered pressurized gas flow from reaching the contaminants and coalesced water, oil or other liquids that have been collected at the bottom of cup 6. The accumulated contamination remains at the bottom of cup 6 without being entrained or re-entrained back into the pressurized gas flow, until it is removed from cup 6 via drain cock 31 or automatic drain 23.

It should be noted that quiet zone 375 is separated from quiet zone 378 by the side wall, e.g., 679 (FIG. 6), of the bottom section of cup 6. Thus, the contaminants either solid or liquid in the quiet zones, which are under different pressures due to the pressure drop across filter element 4, will not be mixed. As a result, there is no likelihood that the contamination in quiet zone 375 might be entrained or re-entrained back into the pre-filtered pressurized gas flow in space 374 via the less-pressurized quiet zone 378.

The clean, filtered pressurized gas that has passed filter element 5 enters an inner space 380 (FIGS. 3 and 9B) of filter element 5, and flows upwardly to the interior of hollow body 1 as indicated by arrow D in FIG. 9B. If filter regulator 100 or 800 is configured solely for filtering purposes, i.e., without pressure regulation, the filtered pressurized gas will be directly delivered to the outlets 102-105, which in this case are unregulated outlets, and subsequently supplied to connected external devices that run on pressurized gas when the respective valves 653 are open. However, if pressure regulation is desirable, a pressure regulator, such as 281 (FIG. 2), will be required.

Pressure regulator 281 can be configured in any manner known in the art.

Figure 9D:
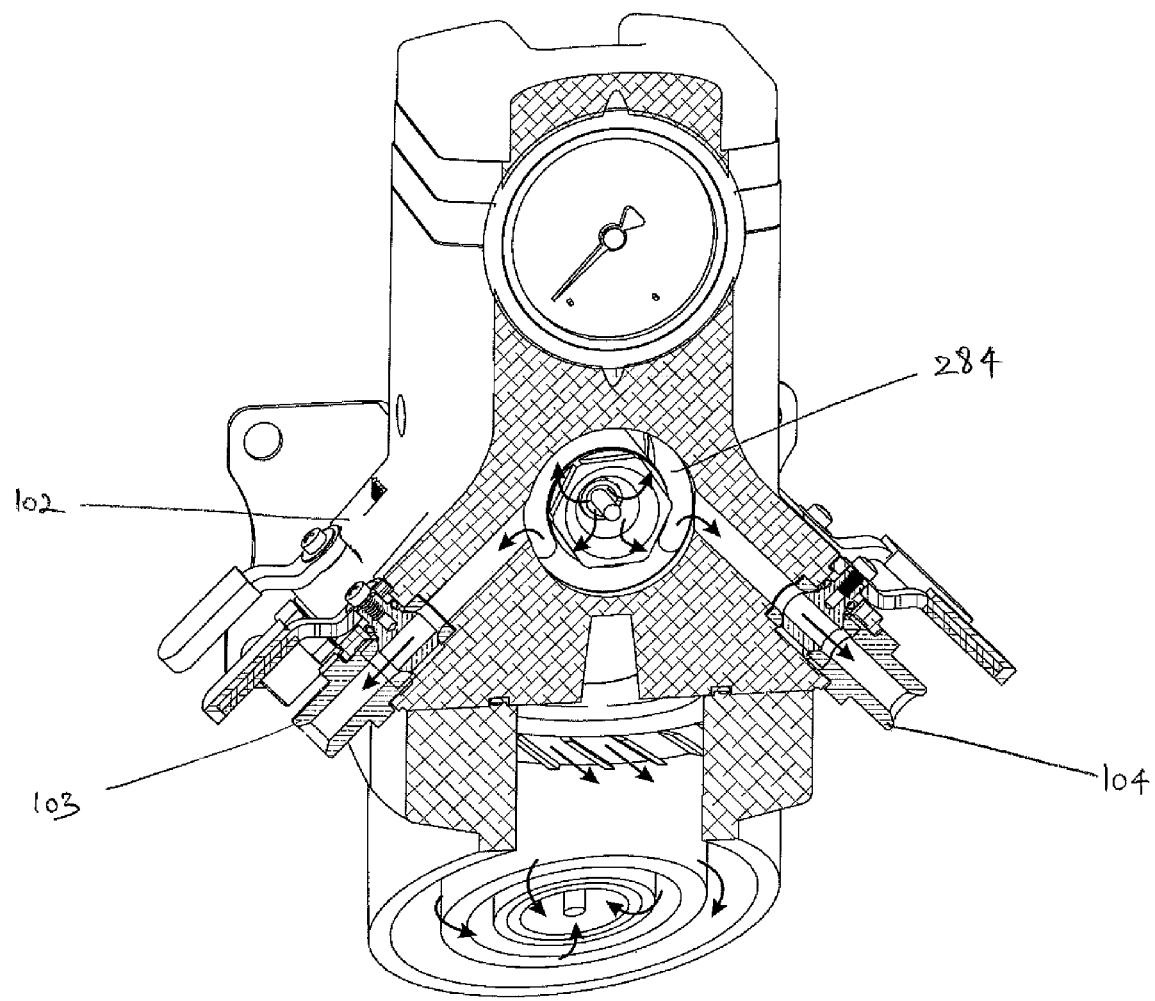
FIG. 9D is a cutaway perspective view showing the internal structure of the filter regulator from the front of the filter regulator.
Figures 10, 11:
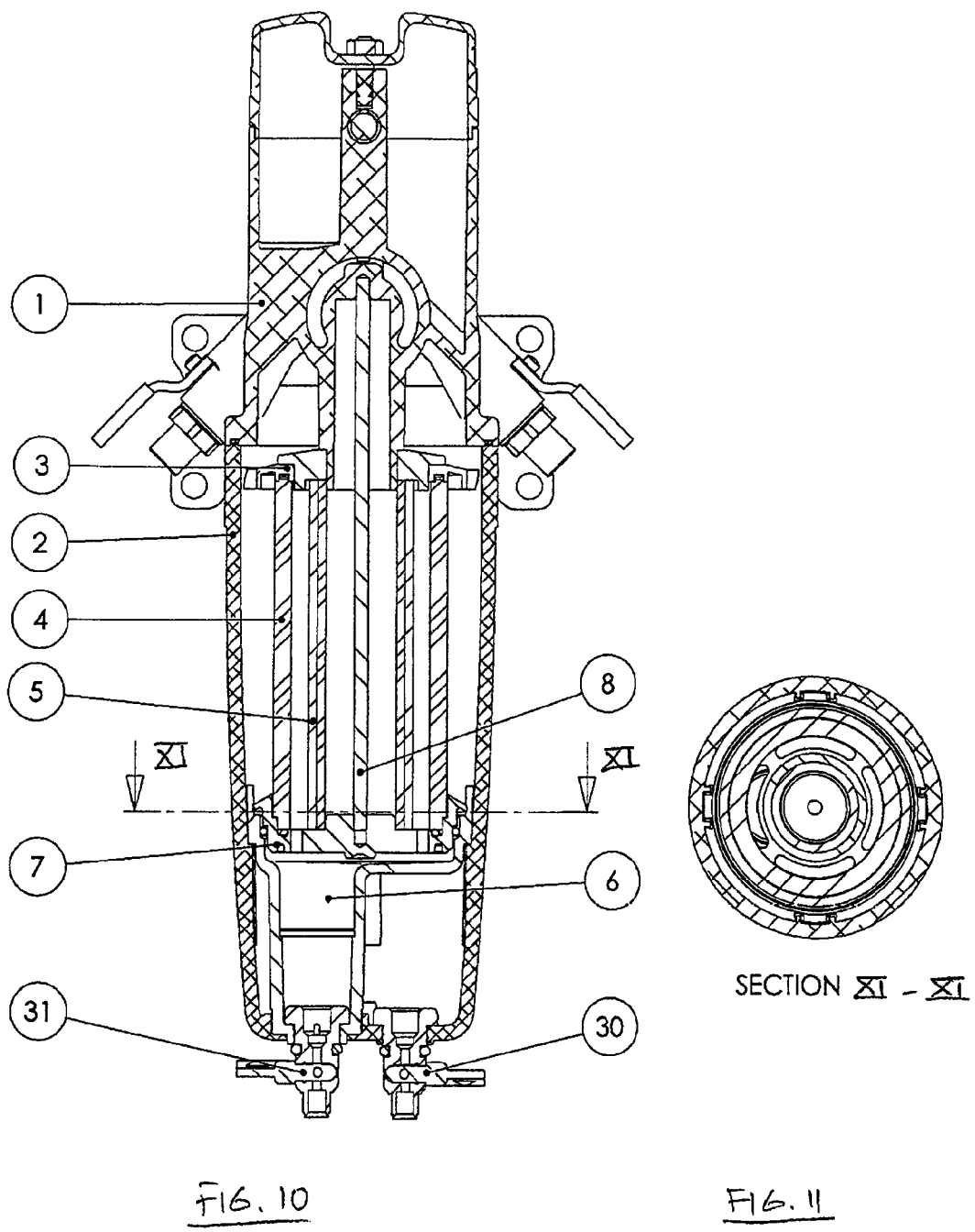
FIG. 10 is a cross sectional view taken along line X-X in FIG. 8B.
FIG. 11 is a cross sectional view taken along line XI-XI in FIG. 10.
Figure 12:
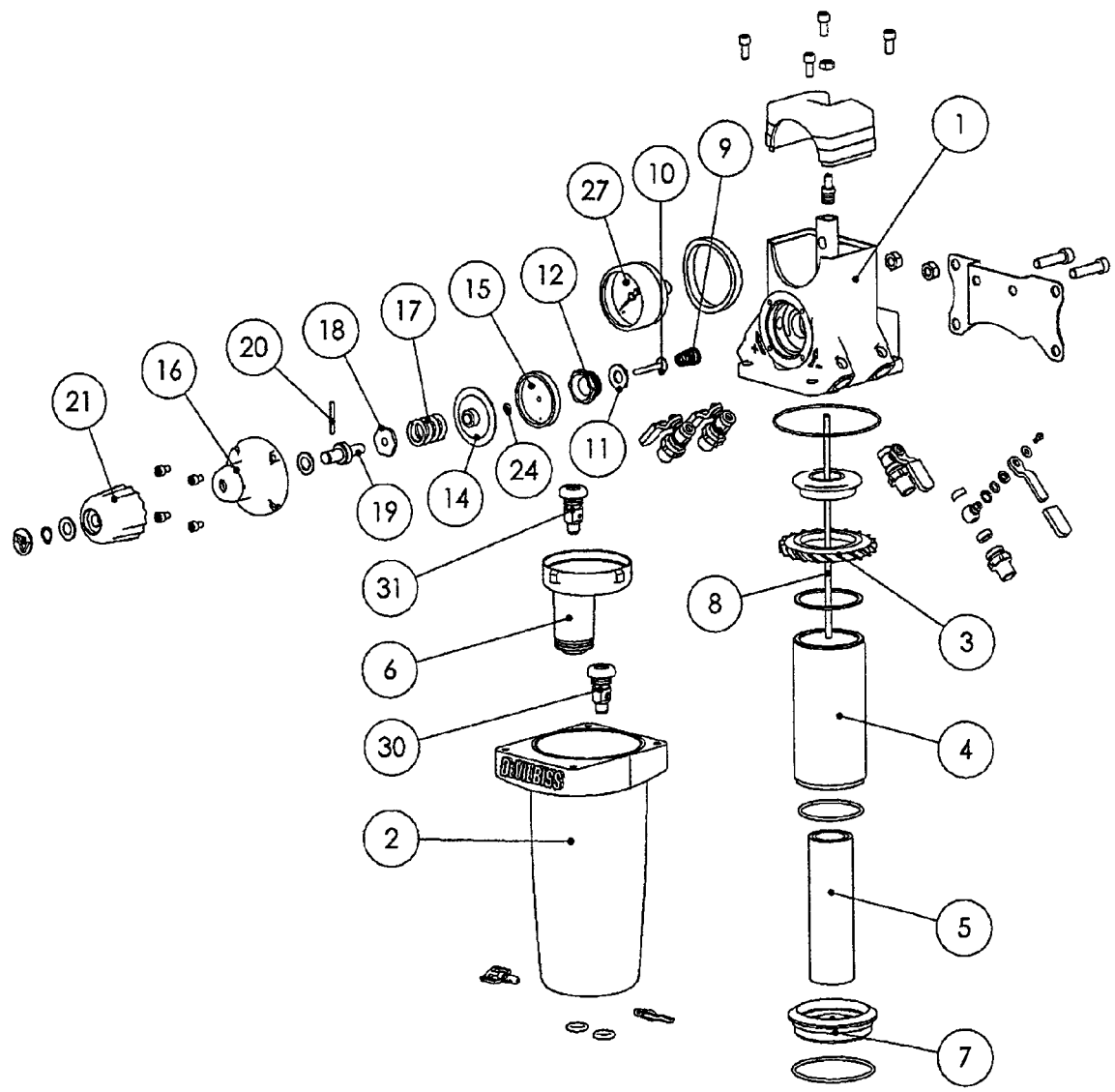
FIG. 12 is an exploded view of the filter regulator shown in FIG. 8A.

In the specific embodiment of FIGS. 2 and 9B-9D, pressure regulator 281 includes a valve 282 that separates the interior of hollow body 1 into two chambers, i.e., an upstream chamber 283 (also shown in FIG. 9C) and a downstream chamber 284 (also shown in FIG. 9D). Upstream chamber 283 is in fluid communication with inner space 380 of filter element 5 and receives the filtered pressurized gas therefrom. Upstream chamber 283 is also in fluid communication with unregulated outlet 102 as best seen in FIG. 9C. Since the pressure in upstream chamber 283 is unregulated, upstream chamber 283 is a unregulated chamber and the unregulated, filtered pressurized gas is provided at unregulated outlet 102. Downstream chamber 284, on the other hand, is a regulated chamber meaning that its pressure is regulated by pressure regulator 281. Downstream chamber 284 is in fluid communication with regulated outlets 103-105 as best seen in FIG. 9D, and a regulated, filtered pressurized gas is provided at the regulated outlets 103-105.

Valve 282 includes a valve stem 10 and a valve seat 11. In the specifically disclosed embodiment of FIG. 2, valve seat 11 is a flexible member or seal that rests on an end of nut 12, which, in turn, is screw into an threaded recess in an inner wall of hollow body 1. A spring 9 is provided to bias valve stem 10 against valve seat 11, thereby closing valve 282 at no-flow. The provision of nut 12 allows easy assembly of valve 282, wherein spring 9, valve stem 10 and valve seat 11 are placed in a receiving cavity within hollow body 1, and nut 12 is subsequently threaded in to its receiving recess to fix valve 282 in place.

Valve stem 10 further extends through aligned central openings of nut 12 and disc 15 to engage an opening (right opening in FIG. 9B) of a through hole 689 (FIG. 6) at a central portion 685 (FIG. 6) of a diaphragm 14. A tapered or rounded end 938 of valve stem 10 rests against a surface around the right opening in FIG. 9B of through hole 689, and therefore, a movement of central portion 685 having through hole 689 to the right (in FIG. 9B) will move valve stem 10 to the right (in FIG. 9B) against action of spring 9. The right opening (in FIG. 9B) of through hole 689 is normally sealingly closed by valve stem 10 and O-ring or seal 24. However, valve stem 10 is not rigidly fixed to through hole 689 or any other part of central portion 685 or diaphragm 14. Thus, a movement of central portion 685 having through hole 689 to the left (in FIG. 9B) will not move valve stem 10 therewith. As a result, the right opening (in FIG. 9B) of through hole 689 can be open by a clearance between seal 24 and tapered or rounded end 938 of valve stem 10. In an embodiment, central portion 685 of diaphragm 14 is made of a rigid material, such as metal or rigid plastic, whereas its peripheral portion 686 (FIG. 6) is made of a deformable material, such as rubber, rubber-coated fabric, or fabric-reinforced rubber. The peripheral portion of 686 in a further embodiment is elastically deformable. Other arrangements and/or materials are, however, not excluded.

Peripheral portion of 686 of diaphragm 14 is tightly clamped between the rim of dick 15 and a spring housing 16 when spring housing 16 is fastened against hollow body 1 by way of, e.g., bolts 687 (FIG. 6). Other connection types, e.g., threaded connection, between spring housing 16 and hollow body 1 can be used as well. As a result of such construction, central portion 685 of diaphragm 14 and, hence, valve stem 10 is movable back and forth about a rest position due to the flexibility of peripheral portion of 686 of diaphragm 14. Disc 15 defines a diaphragm chamber 939 (FIG. 9B) for diaphragm 14, thereby significantly reducing physical contact of diaphragm 14 with the main flow of filtered pressurized gas flowing through pressure regulator 281. Thus, the service file span of diaphragm 14 can be prolonged. Diaphragm chamber 939 is in fluid communication with downstream chamber 284 by orifice 688 (FIG. 6) formed in disc 15.

An adjustment spring 17 is provided in spring housing 16 and exerts a spring force, when compressed, on central portion 685 of diaphragm 14. The spring force of adjustment spring 17 is adjusted by knob 21 which engages an adjusting screw 19 via a pin 20. An adjusting nut 18 is positioned at an end of adjustment spring 17 and threadedly engaged with adjusting screw 19. When knob 21 is turned, adjusting screw 19 is also turned which makes adjusting nut 18 to compress or release adjustment spring 17. The invention is not limited to the above described configuration of pressure regulator 281 and other arrangements are not excluded.

The operation of the pressure regulating section of filter regulator 100 as described above will now be explained.

The filtered pressurized gas is supplied from inner space 380 of filter element 5 to upstream chamber 283. The pressure of the filtered pressurized gas in upstream chamber 283 has not yet been regulated and may fluctuate with the line pressure upstream of inlet 252. The unregulated pressure of the filtered pressurized gas in upstream chamber 283 together with spring 9 press valve stem 10 against valve seat 11, thereby closing valve 282. No filtered pressurized gas is provided to downstream chamber 284 and its regulated outlets 103-105. The unregulated filtered pressurized gas is, however, available at unregulated outlet 102 of upstream chamber 283.

When knob 21 is turned, e.g., clockwise, to adjust a setting of pressure regulator 281 to a desired output regulated pressure, adjustment spring 17 is moved to the left in FIG. 2 (to the right in FIG. 9B). Diaphragm 14 is subsequently moved together with valve stem 10 to the left in FIG. 2 (to the right in FIG. 9B), thereby unseating valve stem 10 from valve seat 11 and opening valve 282. The filtered pressurized gas flows around valve stem 10, as indicated by arrow E in FIG. 9B, through a central opening of valve seat 11 to enter downstream chamber 284. The filtered pressurized gas is now available at regulated outlets 103-105.

As downstream chamber 284 is in fluid communication with the diaphragm chamber 939 through orifice 688 in disc 15, the pressure in the diaphragm chamber 939 that acts against the action of adjustment spring 17, increases together with the pressure in downstream chamber 284, thereby applying an increasing force on the left side of diaphragm 14. It should be noted that the right opening (in FIG. 9B) of through hole 689 is sealed by seal 24, allowing the pressure to build up in the diaphragm chamber 939. Diaphragm 14 and valve stem 10 move gradually to the right of FIG. 2 (to the left in FIG. 9B), compressing adjustment spring 17. The movement of diaphragm 14 and valve stem 10 stops when the pressure in downstream chamber 284, i.e., the pressure in the diaphragm chamber 939, balances the spring force of adjustment spring 17. If one or more of regulated outlets 103-105 is/are open, diaphragm 14 and valve stem 10 remain in the balanced position and maintain the open state of valve 282, thereby ensuring continuous supply of the filtered pressurized gas at the desired or regulated pressure at the open regulated outlets 103-105. When regulated outlets 103-105 are all closed, the balance of forces occurs when valve 282 is closed. The pressure in downstream chamber 284 is now at the desired level regulated by knob 21.

The filtered pressurized gas trapped in downstream chamber 284 and diaphragm chamber 939 can be released after regulated outlets 103-105 are closed by turning knob 21 in the opposite direction, i.e., counter clockwise, to reduce the regulated pressure. In particular, when the compressive force of adjustment spring 17 is removed by turning knob 21 counterclockwise, the pressure of the trapped filtered pressurized gas in downstream chamber 284 and diaphragm chamber 939 will move diaphragm 14 to the left (in FIG. 9B). As valve stem 10 is stopped by nut 12 and seal 11, seal 24 carried by diaphragm 14 will move relative to valve stem 10 to a position corresponding to tapered end 938 of valve stem 10, at which the right opening (in FIG. 9B) of through hole 689 will open allowing the trapped filtered pressurized gas to escape diaphragm chamber 939 and downstream chamber 284 through centre hole 689 of diaphragm 14 into the interior of spring housing 16 to be subsequently vented outside.

Other types of pressure regulators, such as electronic pressure regulators, can also be used in accordance with other embodiments of the present invention.

The pressure in downstream chamber 284 is indicated by a pressure gauge 27 mounted on the front side of hollow body 1. Pressure gauge 27 can be of any type of pressure gauges known in the art. Pressure gauge 27 is, in an embodiment, threadedly mounted in a hole 690 (FIG. 6) formed in hollow body 1 via a seal 691.

Likewise, the line pressure, or the pressure in space 374, is indicated by a pressure gauge 26 mounted on the front side of hollow body 1. Pressure gauge 26 can be of any type of pressure gauges known in the art. Pressure gauge 26 is, in an embodiment, threadedly mounted in a hole 692 (FIG. 6) formed in the side wall of bowl 2.

Figure 7:
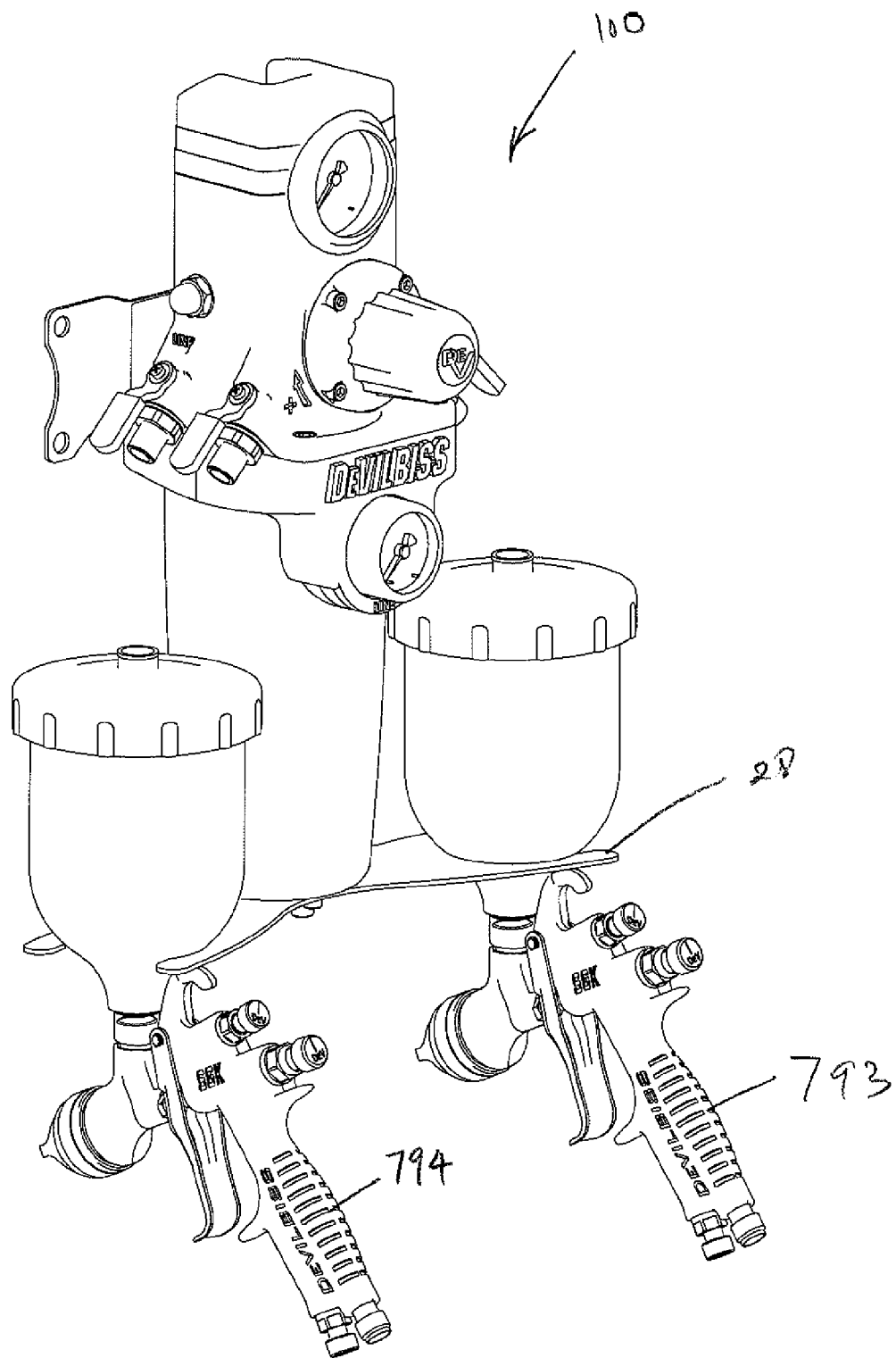
FIG. 7 is a perspective view showing the filter regulator of FIG. 1A and two spray guns.
Figures 8A, 8B:
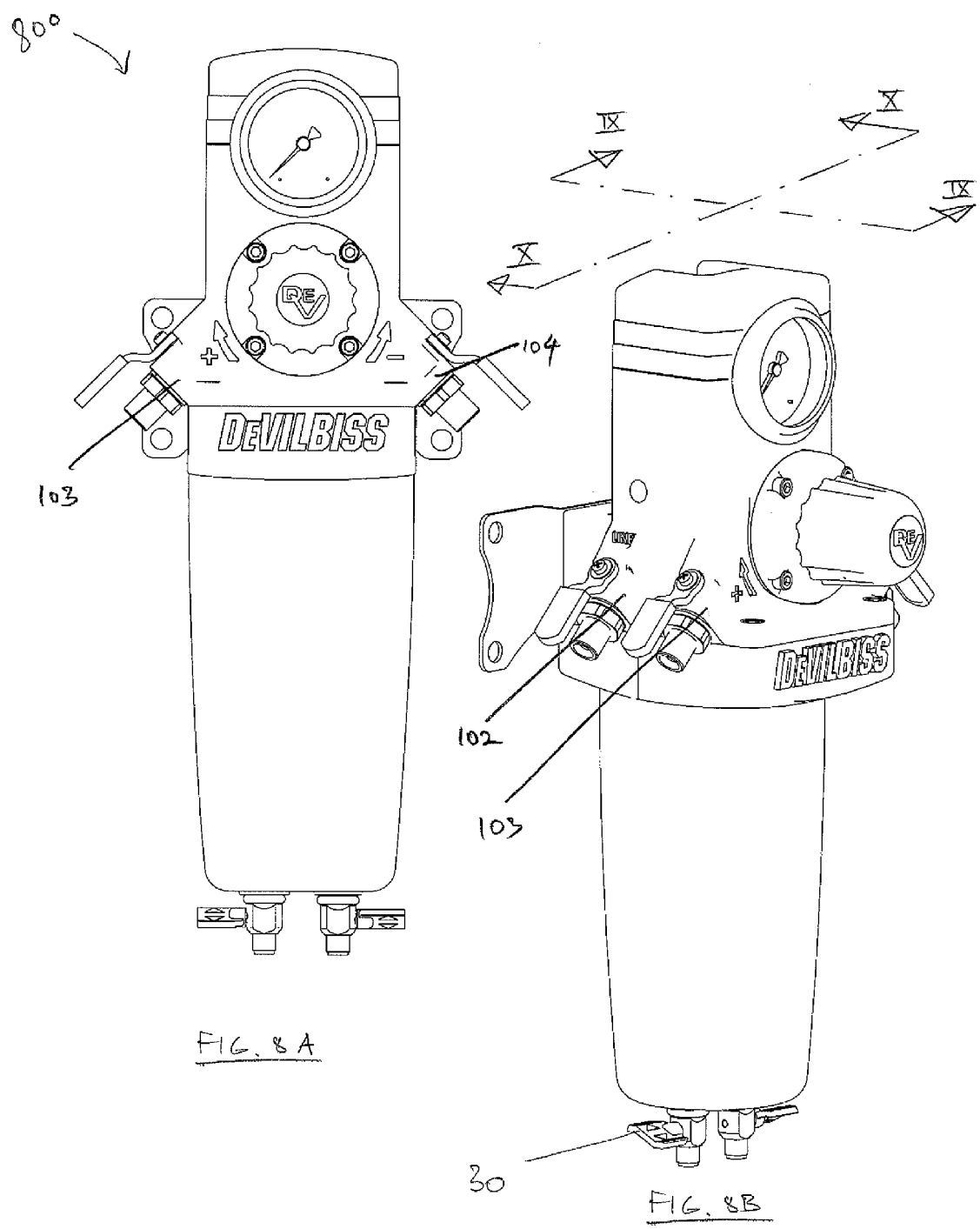
FIG. 8A is a front view of a filter regulator in accordance with a further embodiment of the present invention.
FIG. 8B is a front-left-top perspective view of the filter regulator shown in FIG. 8A.

Filter regulator 100 in some embodiment further includes a bracket 28 mounted at the bottom of bowl 2 for hanging one or more spray or duster guns as shown in FIG. 7. Guns 794, 793 in FIG. 7 can be spray guns of any type known in the art. Examples for guns 793, 794 are provided in U.S. Patent Application Publication No. U.S. 2003/0230636 which is incorporated by reference herein in its entirety.

Filter regulator 100 in further embodiments includes a filter-change indicator 29 mounted at a side of hollow body 1 for indicating when it is necessary to replace either one or some or all filter elements of filter arrangement 256. In the specifically disclosed embodiment of FIGS. 5A and 5B, filter-change indicator 29 indicates when it is required to replace the entire filter arrangement or filter cartridge 256.

Figures 5A, 5B:
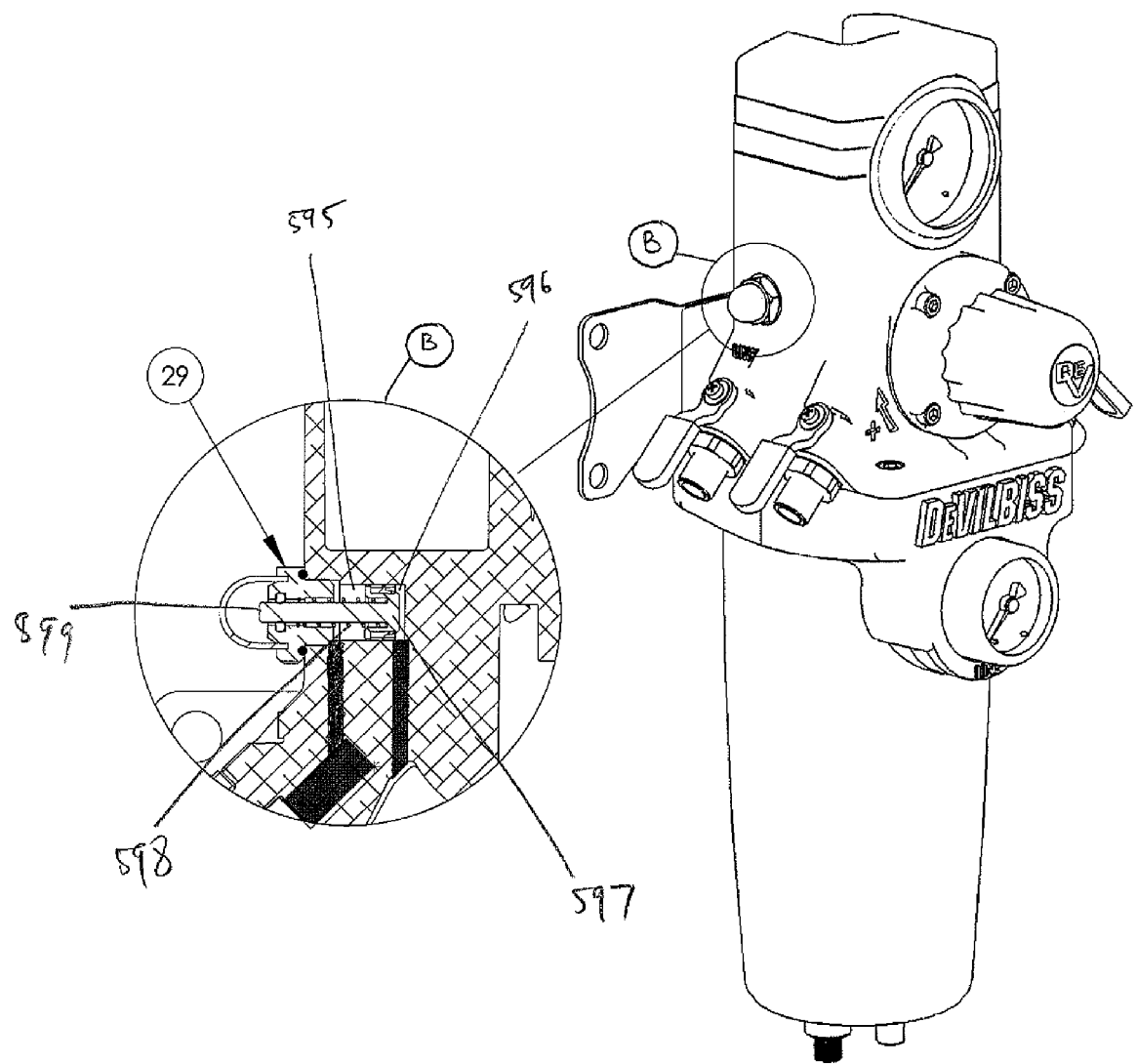
FIG. 5A is a view similar to FIG. 1B.
FIG. 5B is an enlarged, cross sectional view of circled area B in FIG. 5A.
Figure 6:
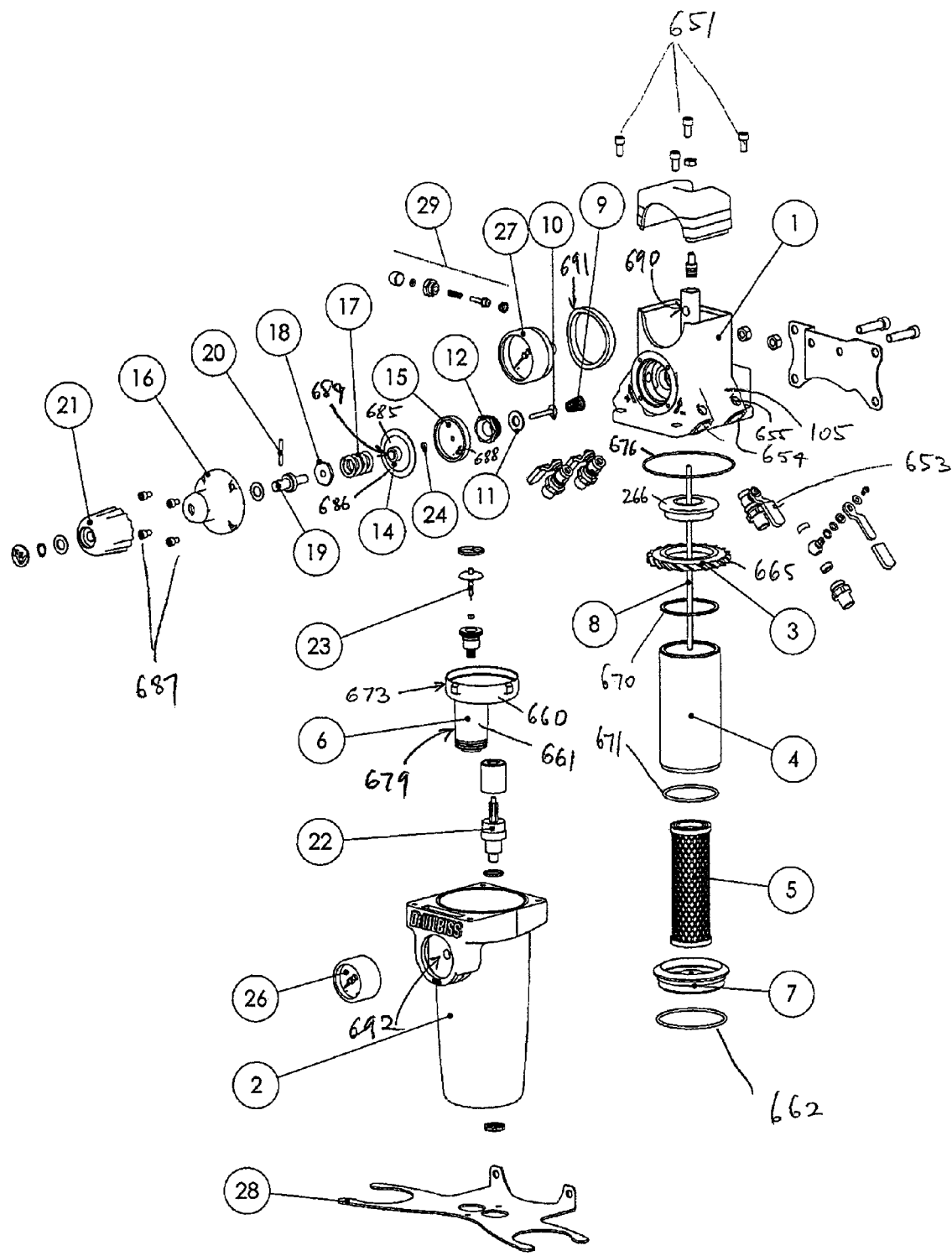
FIG. 6 is an exploded view of the filter regulator shown in FIG. 1A.

Filter-change indicator 29 in FIG. 5B is driven by the pressure difference between the line pressure and the pressure of the filtered pressurized gas. As can be seen in FIG. 5B, filter-change indicator 29 includes first chamber 595 and second chamber 596 separated by a moveable partition, such as a piston 597. A diaphragm or other elements can be used instead of piston 597. First chamber 595 is in fluid communication with space 380 or upstream chamber 283 of hollow body 1 and has the pressure of the filtered pressurized gas. Second chamber 596 is in fluid communication with inlet 252 or space 374 and has the line pressure. The pressure difference acting on piston 597 is oriented to the left in FIG. 5B and corresponds to the pressure drop across filter arrangement 256. Piston 597 is maintained in the retracted position shown in FIG. 5B by action of compression spring 598 which biases piston 597 to the right of FIG. 5B. When filter arrangement 256, especially filter element 4, becomes clogged, the pressure drop across filter arrangement 256 increases. The force acting on the right of piston 597 also increases. When the clogging of filter arrangement 256 has reached an unacceptable level, i.e., when the pressure drop across filter arrangement 256 has become sufficiently, the force acting on the right of piston 597 outbalances the spring force of spring 598 and moves piston 597 to the left of FIG. 5B. As a result, an outer end 599 of piston 597 pops out to indicate that filter arrangement 256 need service or replacement. Filter-change indicator 29 can be arranged to individually indicate the clogging state of each filter element in filter arrangement 256 by connecting first chamber 595 and second chamber 596 to the respective spaces, such as 374, 380, 377 etc. Several filter-change indicators can be provided as well.

The embodiments disclosed above with reference to FIGS. 1-7 provide several advantages. In particular, the arrangement of a front pressure adjusting knob (21), a vertical inlet (252) in the back of the filter regulator, four downwardly inclined outlets (102-105) providing both regulated and unregulated clean pressurized gas, and enclosed pressure gauges (26, 27) is unique. In the conventional filter regulators, the inlet is at a side, only one regulated outlet is provided, the pressure adjusting knob is at the top of the filter regulator, and the gauges are exposed.

Further, the arrangement of filter elements 4 and 5 with one inside another is also unique. The filter elements can be coaxial or concentric but off-center arrangements are not excluded. In the conventional filter regulators, filter elements 4 and 5 are placed in separate bowls and do not provide the 2-in-1 configuration of the filter arrangement 256 in accordance with the disclosed embodiments.

In addition, the mounting of pressure gauge 26 directly on the wall of hollow body 1 for indicating the line pressure is advantageous. In the conventional filter regulators, the line pressure is indicated by a separate gauge mounted outside the filter regulator, usually in the air line.

Furthermore, the provision of a water or liquid collection piece, such as cup 6, advantageously allows two drains (22, 23) of two separate chambers (375, 378) to be disposed in a single bowl (2). In the conventional filter regulators, only one drain is positioned inside a bowl.

Additionally, the incorporation of valves 253 with hollow body 1 is novel. In the conventional filter regulators, the valves are separate from the filter regulator and are connected thereto by fittings.

Moreover, no known filter regulators provide a gun mounting bracket.

The disclosed embodiments are particularly suitable for spray painting, but other applications are not excluded.

While the present invention has been illustrated by the description of the embodiments thereof, and while the embodiments have been described in considerable detail, it is not the intention of the applicant to restrict or in any way limit the scope of the appended claims to such detail. Additional advantages and modifications could be made herein without departing from the scope of the described embodiments as defined by the appended claims. Furthermore, although elements of the described embodiments may be described or claimed in the singular, the plural is contemplated unless limitation to the singular is explicitly stated.

The invention claimed is:

1. A filtering apparatus, comprising:
 a housing having an inlet and at least an outlet
 a filter arrangement disposed in said housing, downstream of said inlet and upstream of said outlet for filtering a pressurized gas entering said housing through the inlet to provide a filtered pressurized gas at the outlet, wherein the filter arrangement comprises first and second tubular filter elements, and the first filter element is located within the second filter element; and
 a pressure regulator disposed in an upper portion of said housing, downstream of said filter arrangement and upstream of said at least one outlet for regulating a pressure of the filtered pressurized gas in accordance with a setting of said pressure regulator to provide a regulated, filtered pressurized gas at said at least one outlet,
 wherein
 said upper portion of said housing comprises a unregulated chamber and a regulated chamber separated by a valve of said pressure regulator; and
 said at least one outlet comprises one or more regulated outlets formed in a wall of the regulated chamber;
 said filtering apparatus further comprising a unregulated outlet formed in a wall of said unregulated chamber for providing the unregulated, filtered pressurized gas at said unregulated outlet.

2. The filtering apparatus of claim 1, wherein said first filter element is a fine filter and said second filter element is a coarse filter.

3. The filtering apparatus of claim 2, wherein said first filter element is positioned downstream of said second filter element.

4. The filtering apparatus of claim 3, further comprising a bottom plate supporting said first and second filter elements from below and having therein at least a through hole corresponding to a space between said first and second filter elements for draining purposes.

5. The filtering apparatus of claim 4, further comprising
a cup disposed beneath the through hole of the bottom plate for collecting therein contaminants filtered out of the pressurized gas by the first filter element; and
a controlled opening at a bottom of said cup for controllable removal of the contaminants.

6. The filtering apparatus of claim 5, wherein
said housing further comprises a first drainage hole at a lower portion thereof;
the bottom of said cup is engaged with the housing at the first drainage hole, thereby allowing controllable removal of the contaminants from within the cup, through the controlled opening at the bottom of said cup and the first drainage hole, to an outside of said housing;
the bottom of said cup extends through the first drainage hole; and
the controlled opening is fitted with a first valve for automatically or manually removing the contaminants.

7. The filtering apparatus of claim 1, wherein
said inlet is positioned on a rear side of the upper portion of the housing and is oriented upwardly;
a pressure adjusting control of said pressure regulator for manually adjusting the setting thereof is positioned on a front side of the upper portion of the housing; and
said regulated and unregulated outlets are positioned on opposite, lateral sides of the upper portion of the housing and oriented obliquely downwardly.

8. The filtering apparatus of claim 7, wherein
each of said regulated and unregulated outlets is integrally fitted with a valve for selectively opening or closing said outlet.

9. The filtering apparatus of claim 8, further comprising at least one pressure gauge received in a port formed in at least one of the upper and the lower portions of said housing for measuring the pressure of at least one of the unregulated, filtered pressurized gas and the regulated, filtered pressurized gas;
wherein said at least one pressure gauge is positioned on the front side of the respective upper or lower portion of said housing.

10. The filtering apparatus of claim 9, further comprising a bracket mounted at a bottom of the lower portion of said housing;
said bracket comprising at least one recess or slot for receiving and holding therein a spray or duster gun which is connectable to one of the regulated and unregulated outlets to receive the filtered pressurized gas therefrom.

11. The filtering apparatus of claim 1, wherein the valve of said pressure regulator includes a valve seat and a valve head which are biased towards a closed position of said valve;
said pressure regulator further comprising a pressure adjusting control for adjusting the setting of said pressure regulator;
wherein said pressure adjusting control is adjustable for causing displacement of one of said valve head and valve seat out of said closed position, thereby opening said valve and allowing the filtered pressurized gas to enter the regulated chamber from the unregulated chamber;
wherein said valve head and valve seat are moveable back into the closed position when the pressure in the regulated chamber reaches a desired level corresponding to the adjustment of the pressure adjusting control;
wherein said pressure regulator further comprises first and second springs and a diaphragm;

said pressure adjusting control comprises a knob rotatable to compress the first spring acting on said diaphragm, which is associated with one of the valve head and valve seat, to move said one of the valve head and valve seat out of said closed position to open the valve; and
said second spring and the pressure in the regulated chamber together act on the diaphragm for returning said one of the valve head and valve seat back to said closed position when the pressure in the regulated chamber reaches the desired level.

12. The filtering apparatus of claim 1, further comprising a filter change indicator comprising
a first chamber, which is in fluid communication with a first interior section of said housing located upstream of said filter arrangement, for receiving therein the pressurized gas entering the housing through said inlet;
a second chamber, which is in fluid communication with a second interior section of said housing located downstream of said filter arrangement, for receiving therein the filtered pressurized gas;
a moveable partition separating said first and second chambers;
wherein
said moveable partition is movable from a set position to a filter change position indicating that at least one of the filter elements needs to be replaced, when a pressure difference between said first and second chambers reaches a predetermined level corresponding to a malfunction or clogging of said at least one of the filter elements; and
said filter change indicator further comprises a biasing element biasing said moveable partition into said set position with a biasing force sufficient to allowing said moveable partition to move from said set position to the filter change position when the pressure difference between said first and second chambers reaches said predetermined level.

13. The filtering apparatus of claim 1, wherein said first filter element is a coalescing filter and said second filter element is a particulate filter.

14. A spraying system using pressurized gas, said system comprising
a filtering apparatus as defined in claim 1;
a source of the pressurized gas connected to the inlet of said filtering apparatus;
at least one spraying material reservoir; and
at least one spray gun connected to said spraying material reservoir and at least one outlet of said filtering apparatus.

15. A filtering apparatus comprising:
a housing having an inlet and at least an outlet;
a filter arrangement disposed in said housing, downstream of said inlet and upstream of said outlet for filtering a pressurized gas entering said housing through the inlet to provide a filtered pressurized gas at the outlet, wherein the filter arrangement comprises first and second tubular filter elements, and the first filter element is located within the second filter element;
a bottom plate supporting said first and second filter elements from below and having therein at least a through hole corresponding to a space between said first and second filter elements for draining purposes;
a cup disposed beneath the through hole of the bottom plate for collecting therein contaminants filtered out of the pressurized gas by the first filter element; and
a controlled opening at a bottom of said cup for controllable removal of the contaminants; and wherein
said housing further comprises a first drainage hole at a lower portion thereof;
the bottom of said cup is engaged with the housing at the first drainage hole, thereby allowing controllable removal of the contaminants from within the cup, through the controlled opening at the bottom of said cup and the first drainage hole, to an outside of said housing;
the bottom of said cup extends through the first drainage hole;
the controlled opening is fitted with a first valve for automatically or manually removing the contaminants;
said housing further comprises a second drainage hole at the lower portion thereof; and
the second drainage hole is fitted with a second valve for automatically or manually removing contaminants filtered out of the pressurized gas by the second filter element and subsequently collected in the lower portion of said housing, whereby contaminants filtered out of the pressurized gas by the first and second filter elements are separately removable through the first and second valves, respectively.

16. The filtering apparatus of claim 15, being a filter regulator and further comprising
a pressure regulator disposed in an upper portion of said housing, downstream of said filter arrangement and upstream of said at least one outlet for regulating a pressure of the filtered pressurized gas in accordance with a setting of said pressure regulator to provide a regulated, filtered pressurized gas at said at least one outlet.

17. The filtering apparatus of claim 15, further comprising:
a deflector positioned upstream of the second filter element and downstream of the inlet, wherein said deflector has a plurality of radial fins extending obliquely relative to an axial direction of said filter elements for imparting a swirling motion to a flow of the pressurized gas entering said housing through the inlet;
a rod extending axially within said second filter element;
said rod having opposite upper and lower ends connected with an upper portion of the housing and the bottom plate, respectively; and
a cap for removably fixing the deflector at an upper end of said filter arrangement;
wherein
at least one of the connections of the upper and lower ends of said rod with the corresponding one of said housing and bottom plate is removable, thereby allowing removable securement of the filter arrangement in said housing;
said cap and said deflector have annular shapes through which said rod extends; and
said filer arrangement and said cap are detachably clamped between the upper portion of the housing and said bottom plate when the upper and lower ends of said rod are connected thereto.

18. A spraying system, comprising:
a filtering apparatus, comprising:
    a housing comprising an inlet and multiple pressure-regulated outlets
    a filter arrangement disposed in said housing, downstream of said inlet and upstream of said outlet for filtering a pressurized gas entering said housing through the inlet to provide a filtered pressurized gas at the outlets, wherein the filter arrangement comprises first and second tubular filter elements, and the first filter element is located within the second filter element;
a source of the pressurized gas connected to the inlet of said filtering apparatus;
multiple spraying material reservoirs; and
multiple spray guns each connected to a separate one among the spraying material reservoirs and a separate one among the pressure-regulated outlets of said filtering apparatus.

19. The spraying system of claim 18, further comprising a duster gun connected to a unregulated outlet of said filtering apparatus but to none of the spraying material reservoirs;
wherein at least two of said spray and duster guns are receivable and retainable in corresponding slots of a bracket mounted at a bottom of the housing of said filtering apparatus.

20. The spraying system of claim 19, wherein at least one of said spraying material reservoirs is connected to one of the pressure-regulated outlets of said filtering apparatus for pressurizing the spraying material in said spraying material reservoir.

* * * * *